Dec. 7, 1926.  
E. R. ROSS  
1,609,737  
WHEEL AND AXLE  
Filed March 22, 1924
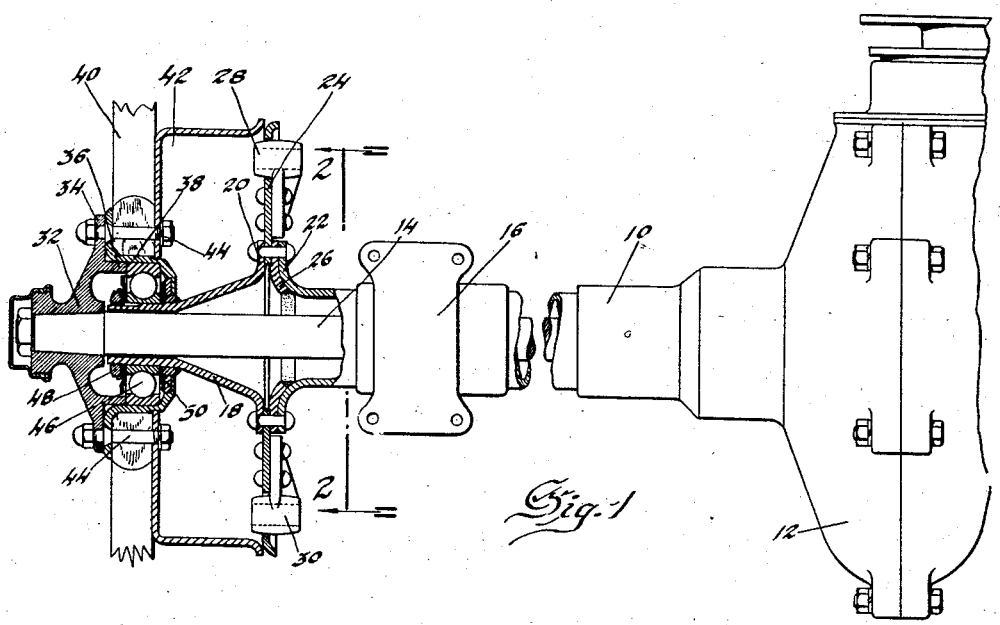
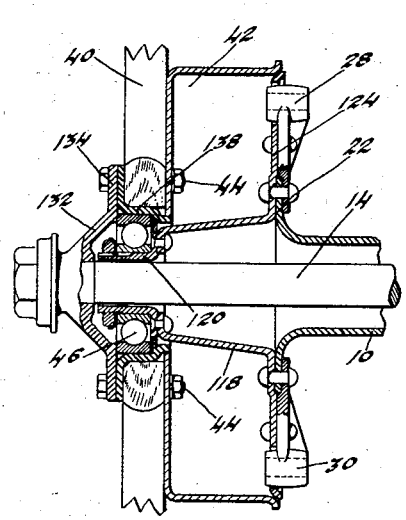
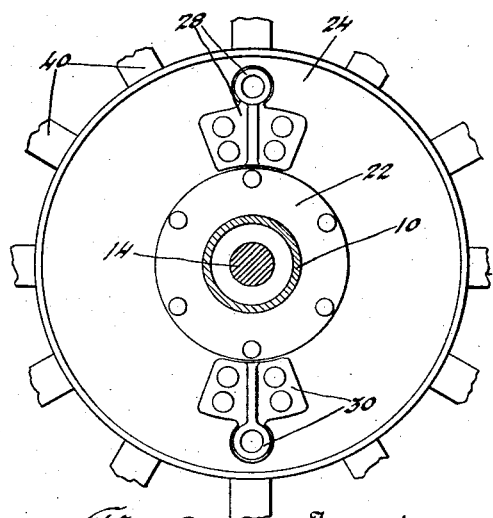
Inventor  
Elmer Ray Ross  
By his Attorneys Patented Dec. 7, 1926.

1,609,737

UNITED STATES PATENT OFFICE.

ELMER RAY ROSS, OF PONTIAC, MICHIGAN, ASSIGNOR TO GENERAL MOTORS CORPORATION, OF DETROIT, MICHIGAN, A CORPORATION OF DELAWARE.

WHEEL AND AXLE.

Application filed March 22, 1924. Serial No. 701,092.

This invention relates to motor vehicles, and is illustrated as embodied in a wheel and axle having a novel arrangement of parts securing the advantages of a three-quarter floating axle with a simple and inexpensive construction. An object of the invention is to provide an arrangement of this character which will permit the use of drawn or stamped parts, with consequent reduction in cost.

Having this object in view, the wheel hub has a flange, which supports the spokes or other load-carrying parts of the wheel, and which incloses an anti-friction bearing shown in the plane of the spokes or their equivalent, and which is supported by the end of the axle housing, this preferably being a separate bearing-supporting part which is secured in any suitable manner to the housing proper, and which may be a sheet metal stamping. Other features of the invention relate to the manner of securing the spokes to the hub, to the construction of the end of the axle housing, and to other desirable particular constructions explained below in describing two illustrative embodiments shown in the accompanying drawings, in which—

Fig. 1 is a view, partly in top plan and partly in horizontal section, of a wheel and axle embodying the invention;

Fig. 2 is a section on the line 2—2 of Fig. 1, showing part of the wheel and brake mechanism in side elevation; and Fig. 3 is a view corresponding to part of Fig. 1, but showing a modified construction.

The invention is shown embodied in a wheel and axle comprising an axle housing 10 extending laterally from a differential housing 12, and inclosing a drive axle 14. The housing may carry a spring pad 16. The end part of the housing is a separate tapered section 18, drawn or stamped from sheet metal, and formed with an inner flange 20 riveted or otherwise secured to a corresponding flange 22 on the housing proper. Preferably a brake-supporting plate 24, and if desired a reinforcing plate 26, are clamped between flanges 20 and 22 and held by the rivets or other fastenings. Supports 28 and 30, for the brake cam shaft and the brake anchor, may be riveted or otherwise secured to plate 24.

The driving axle 14 extends through and beyond the tapered section 18, and is secured to a hub 32, having a radially extending flange 34, and an inwardly extending ledge shown in Figure 1 as constituting an integral part 36 of the hub 32. The spokes 40, or their equivalent, rest on a cylindrical portion 38 of a spoke clamping member having a radially extending flange arranged substantially parallel with the flange 34 of the hub, and the spokes are clamped between said flange and a brake drum 42 by bolts 44. An anti-friction bearing 46 is arranged between the cylindrical portion 38 and a cylindrical surface at the end of the tapered section 18, said bearing being held in place and against a collar upon the tapered section by a nut 48 threaded on end of section 18. A felt or other packing 50 held by an inwardly extending flange of the part 38 prevents loss of lubricant. It will be noted that the bearing 46 is in the plane of the spokes 40, so that there is no bending strain on the driving axle 14.

In the modification shown in Fig. 3, tapered section 118 of the housing 10 is integral with the brake plate 124, the whole being a drawn or stamped metal part. In order to provide a strong bearing-supporting part without undue thickness in the original blank, a separate bearing-supporting stamping 120 is provided for the bearing 46, the stamping being riveted or otherwise secured to an in-turned flange on section 118. Hub 132 is provided with a radial spoke-clamping flange 134, as before, while the inwardly extending flange is in the form of a separate stamping 138. In this, as in the first form, it will be seen that the advantages of a three-quarter floating construction are secured in an inexpensive manner involving a maximum use of cheap sheet metal parts.

While two embodiments of the invention have been described, it is not my intention to limit its scope to those particular embodiments, or otherwise than by the terms of the appended claims.

I claim:

1. In combination, a tubular axle housing having an outwardly extending and substantially radially arranged flange at its end; a hollow tapering bearing supporting member having a flange at its inner end corresponding, substantially, with the flange of said housing, and a cylindrical bearing supporting portion at its outer end and adapted to fit within a wheel supporting bearing; a brake supporting plate extending outwardly from and substantially radially relative to said flanges; means whereby said parts are fastened together to thereby provide a unitary housing structure; and brake supporting members carried by and fixedly secured to said brake supporting plate.

2. In combination, a tubular axle housing having an outwardly extending and substantially radially arranged flange at its end; a hollow tapering bearing supporting member having a flange at its inner end corresponding, approximately, with the flange of said housing, and a separately formed cylindrical bearing supporting portion at its outer end and adapted to fit within a wheel supporting bearing; a brake supporting plate extending outwardly from and substantially radially relative to said flanges; and means whereby said parts are fastened together to thereby provide a unitary housing structure.

In testimony whereof I affix my signature.

ELMER RAY ROSS.